INVENTORS
R. PILOTY
W. THIELE
D. PABST
W. BAUER, DECEASED
BY MAGDA BAUER NÉE BECK AND
GABRIELE DEGENKOLB NÉE BAUER

BY Percy P. Lantzy
ATTORNEY

INVENTORS
R. PILOTY
W. THIELE
D. PABST
W. BAUER, DECEASED
BY MAGDA BAUER NÉE BECK AND
GABRIELE DEGENKOLB NÉE
BAUER
BY [signature]
ATTORNEY INVENTORS
R. PILOTY
W. THIELE
D. PABST
W. BAUER, DECEASED
BY MAGDA BAUER NÉE BECK AND
GABRIELE DEGENKOLB NÉE BAUER
BY [signature]
ATTORNEY INVENTORS
R. PILOTY
W. THIELE
D. PABST
W. BAUER, DECEASED
BY MAGDA BAUER NÉE BECK AND
GABRIELE DEGENKOLB NÉE BAUER
BY
ATTORNEY United States Patent Office 3,316,538
Patented Apr. 25, 1967

3,316,538

CIRCUIT ARRANGEMENT FOR PROCESSING PARTS OF WORDS IN ELECTRONIC COMPUTERS

Robert Piloty, Stuttgart-Kaltental, Dietrich Pabst, Markgroningen, Wurttemberg, and Walter Thiele, Schwieberdingen, Wurttemberg, Germany, and Walter Bauer, deceased, late of Stuttgart, Germany, by Magda Bauer, nee Beck, and Degenkolb Gabriel, nee Bauer, Stuttgart-Sollenbuch, Germany, and Barbara Bauer, Haltingen, Sudbaden, Germany, legal heirs, assignors to International Standard Electric Corporation, New York, N.Y., a corporation of Delaware Filed July 25, 1963, Ser. No. 302,756
Claims priority, application Germany, July 31, 1962, St 19,548
4 Claims. (Cl. 340—172.5)

Figure 1:
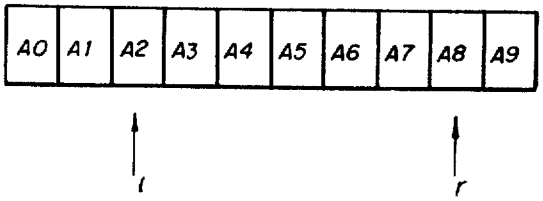

The composition of words in electronic computers represents an important feature which has a considerable influence upon both the range of practical application and the construction of a system.

Different types of computing systems have become known, which operate either with a fixed word length, or with a variable word length. In the case of a fixed word length the storage addresses designate equally large storage cells; for example, to accommodate 7-bit code characters arranged in word groups each having a word length of 12 characters, the storages are divided into multiples of 12×7 bits which are handled in a series-parallel operation. An information item or unit which is individually capable of being stored and addressed as a unit may, in the case of a fixed word length, be shorter, or at most equal, but never longer than, a word. Thus, an information unit which is shorter than the given fixed word length, does not completely utilize the storage capacity.

In order to utilize the available storage capacity, particularly where the incoming information items are of different length, there has been proposed the variable word length system organization, in which the size of a storage cell is variable down to one single character (i.e. one decimal figure or one letter), and to each cell there is assigned a separate address. The cell number of the last character of a recorded word, then represents the address of the word, because the information items are always recorded beginning with the lowest point. The beginning of a word, or the highest point respectively, is characterized by a special marking, the so-called word mark. This marking is a special bit, which is reversed between successive words. The readout of the storage cells in response to a command or instruction, is thus always effected from the given address to the next word mark.

Another conventional approach involves the inclusion of a statement regarding the word length, within the instructions or commands. In accordance therewith, each command contains the address of the last character within the desired word and, in addition thereto, contains a statement regarding the word length.

From the field of printing-telegraphy it is also known to indicate word boundaries by means of starting, terminating or separating signals or characters.

The present invention relates to a circuit arrangement for electronic computers of the first type operating with a fixed word length, by means of which any desired portion of a word can be efficiently selected. Accordingly, there is concerned a combination of fixed and variable word structures, in which the upper limit of a variable word length is determined by the fixed word length. However, arrangements are already known in which the aforementioned problem has been solved for a particular purpose. Thus, for example, in an operation which is commonly referred to as "extraction," certain parts are selected from a word, whereas the remainder of the word is set equal to zero. To this end it is necessary to transfer the whole word from a storage to a processing register, where the not required information is blanked out by shifting, or by way of a logical multiplication, in the course of one or more cycles of operation.

The desired portion of the word is generally specified by an addition to the instruction or command. In the case of words consisting of 10 characters, two decimal numbers are required to this end. If the addition to the command reads e.g. 28, then this means that the information to be selected extends from the second to the eighth character.

The last known arrangement, however, has considerable disadvantages. Either there is required a separate operating cycle for the logical multiplication or otherwise different shifting operations must be executed before the information is positioned at a desired place. The arrangement according to the present invention operates more advantageously. The desired part of the word is directly addressed and controlled, and, in contrast to the known arrangement, there are required no additional operations.

The circuit arrangement according to the present invention processes parts of words in electronic computers organized to handle fixed word lengths. The beginning and the end of the partial word within the fixed word are each capable of being selected by one character. The circuit is characterized by two single character storage devices, for respectively storing the partial word's initial and final addresses, by a counter Z which is connected to the initial-address storage and which is capable of being set to the initial address, and which, from the set position, is stepped on in a step-by-step manner by clock-pulses (timing pulses), and simultaneously effects the read-in/read-out of the partial word into or out of a buffer register R, in character-by-character fashion, and by a comparator connected to the final-address storage and to the counter, and which, in the case of an agreement between the count condition and the character stored in the final-address storage, serves to terminate the read-in/read-out operation thereby determining the end of the partial word. It further serves to connect the counter to an idle position.

According to a further embodiment of the invention it is possible to carry out the partial-word addressing in the main storage unit, or to transfer the entire word from the main storage to an operational register, and then to extract the partial word.

Further features and other embodiments of the invention may be taken from the following description and sub-claims.

Figure 3:
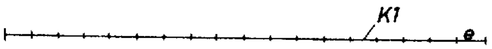
Figure 3:
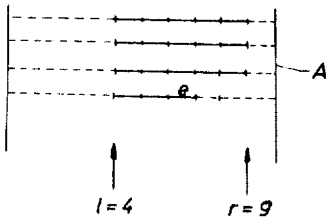
Figure 4:
Figure 4:
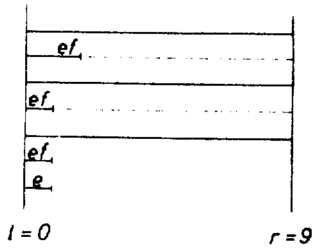
Figure 5:
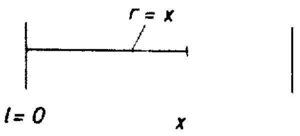
Figure 2:
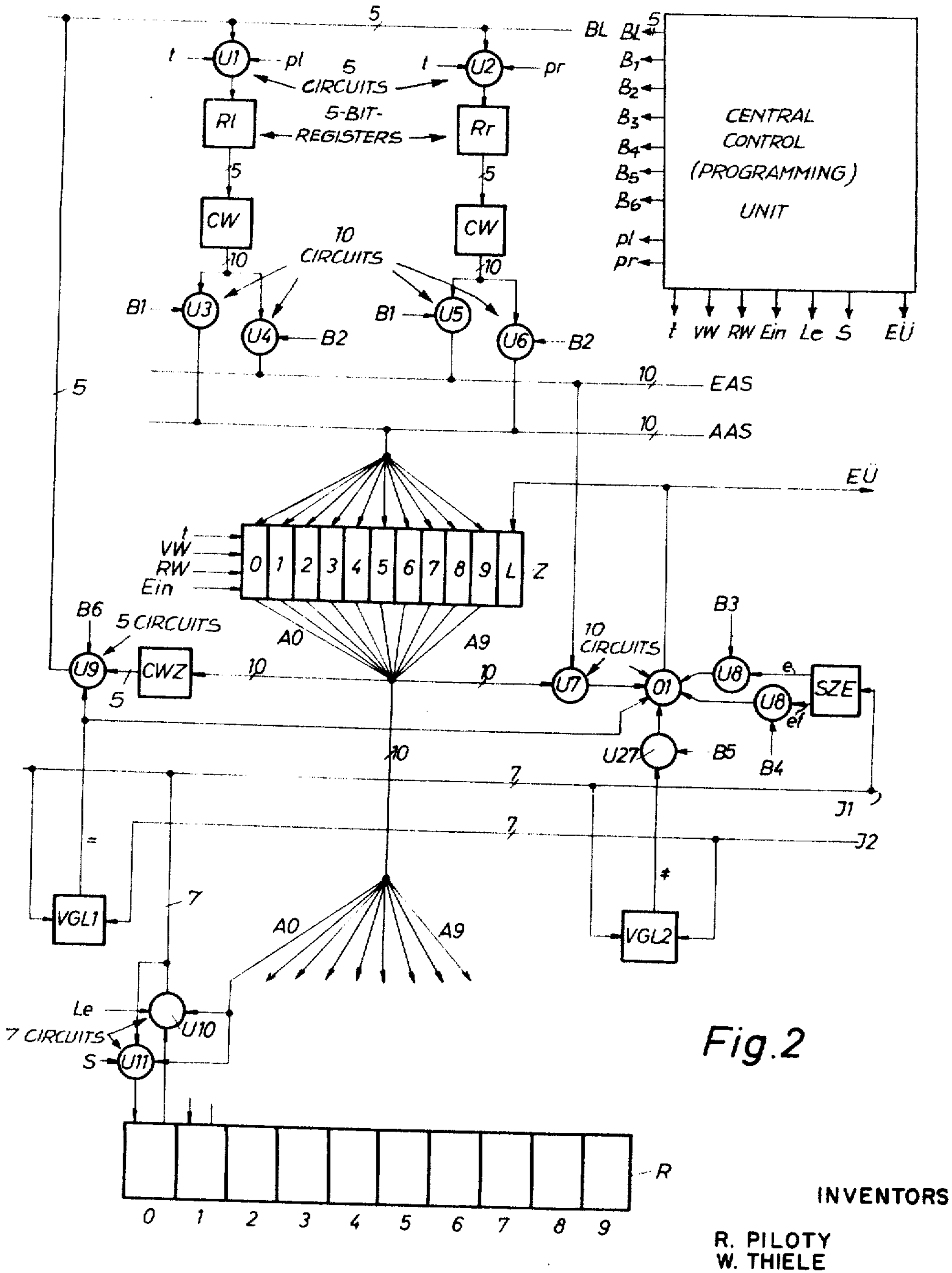
Figure 6:
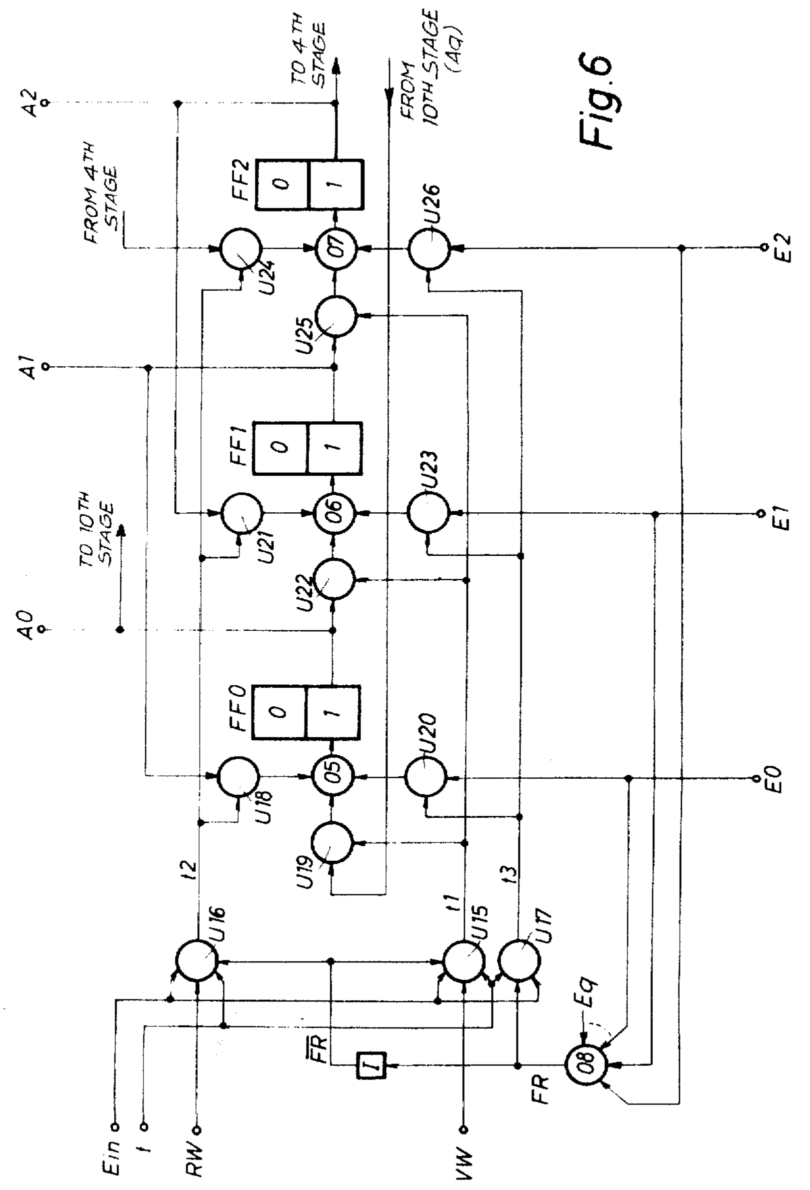
Figure 7:
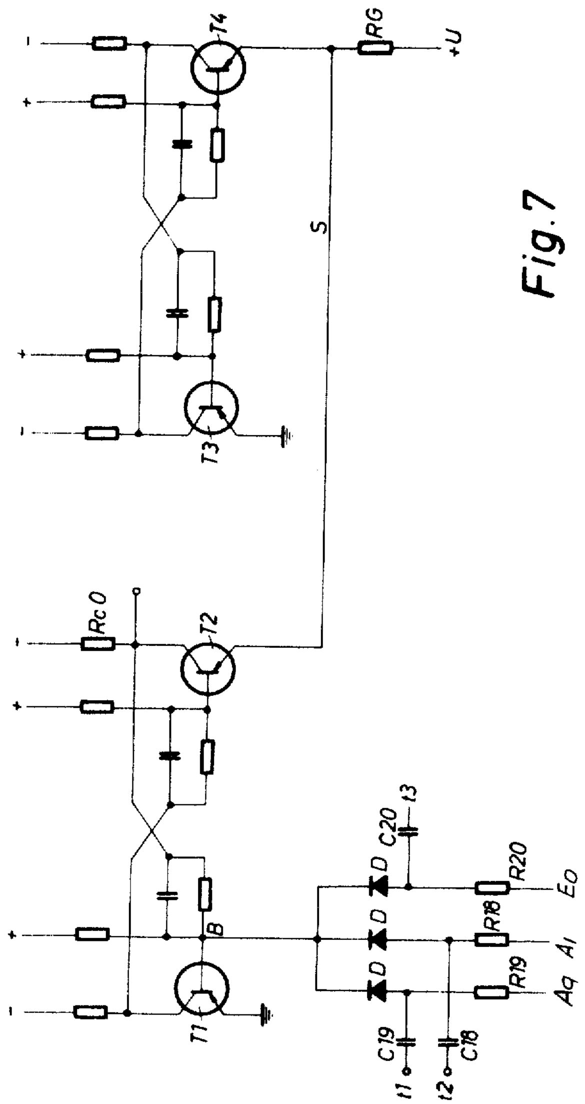

The invention will now be explained in detail with reference to FIGURES 1 to 7 of the accompanying drawings, in which:

FIGURE 1 shows an arrangement of characters in one word comprising 10 characters, as well as the position therein of a partial word to be selected therefrom, FIGURE 2 shows a circuit arrangement according to the invention, FIGURE 3 is a representation of the information during the search process as viewed from the initial or final address of the partial word, FIGURE 4 is a representation of blocks of information arranged for transfer without a control character, FIGURE 5 is a representation of information arranged for transfer in blocks with control characters, FIGURE 6 shows the counter Z of FIGURE 2, and FIGURE 7 shows the locking circuit of the counter Z.

FIGURE 2 shows the entire arrangement for addressing and handling a partial word. The most important parts of this arrangement are two single-character storages R1, Rr, a ring counter Z, and a register R for receiving the actual information. Moreover, there is provided a set of information leads or lines I2 for applying a search or comparison character from another register (not shown), which is to be compared with information stored in the register R.

Wherever a single line is used schematically in FIGURE 2 to represent a set consisting of a plurality of lines, the actual number of lines is indicated by a number adjacent an oblique stroke through the schematic line. Thus, the set I2 should be understood to contain 7 lines in each branch thereof.

The arrangement comprises four sets of bus bars which serve to distribute and forward the instructions, and the information. The bus bar set designated BL serves to convey character signals 1 or *r* respectively, for setting the two single-character storages R1 and R*r*. From the single-character storages, at a particular phase of each word transfer cycle, control information is conveyed via one of two sets of bus bars AAS and EAS, associated respectively with the initial and final addresses of a word block being operated upon, to the counter Z. The latter then controls the transfer of the desired portion of the actual information word, between the bus bars I1 and the register R.

During transfer of a partial word within a word of fixed length, five-bit partial word beginning and end indicators, appearing on the five lines BL, are transferred to the two single-character storages R1 and R*r*, via sets of gating circuits $U_1$ and $U_2$ each set comprising five gates. An output signal is transmitted by the gating circuits if, and only if, a clockpulse *t*, a control signal *p*1 or *pr* respectively, and an information signal 1 or *r* respectively, are present simultaneously. Since the beginning or end information arrives on the bus bar BL in digital code form, and since for controlling a ten-stage counter Z there is required a "1-out-of-10"-selection signal, the two single-character storages are each coupled to a code converter CW operative to convert 5 bit digital inputs to corresponding outputs on 1-out-of-10 lines. These code converters, in turn, are connected to the bus bars AAS and EAS via the four sets of AND-gates $U_3$ to $U_6$, which serve to randomly connect the 1-out-of-10 outputs of the two code converters CW to the two sets of bus bars EAS and AAS. The arrangement is in no way limited to a preferential direction of processing, for example, from the left to the right; in fact, it is possible to perform the readin or readout respectively in both ways at will. If the gating circuits $U_3$ and $U_5$ are enabled by control signal $B_1$, the counter Z is stepped in the forward direction, so that the direction of processing extends from left to right. On the other hand, if the gating circuits $U_4$ and $U_6$ are enabled by a control signal $B_2$, counter Z counts backward and the direction of processing extends from right to left.

From the bus bar set AAS containing ten lines, all ten lines extend directly to ring counter Z. This counter is so arranged that it can be made to count in either the forward or backward direction and, it can be set to an initial count position in accordance with the signal condition of lines AAS. Particulars of the counter will be described in greater detail hereinafter with reference to FIGURES 6 and 7.

The ten outputs of the ring counter Z individually extend firstly to ten single-character storage units of the register R, secondly via a code converter CWZ and a set of five AND-circuits $U_9$, to the input bus bar BL, and thirdly to the comparator circuit $U_7$. A second set of ten inputs extends to the circuit $U_7$ from the final-address bus bar set EAS. For the sake of simplicity in place of the ten AND-circuits $U_7$, there is schematically shown only one AND-circuit. In the same way, with respect to the information register R, there has only been shown the input-output circuit for the 0-th position; the input-output circuits for the other positions being designed in a similar way.

If a writing signal S is applied to the seven gating circuits $U_{11}$, then these circuits will be unblocked when counter Z is in the "0" position, and 7-bit information conveyed in parallel on lines I1 will have access to the "0" position of the register. Similarly, and in response to a reading signal L*e*, a 7-bit information character is read out of the "0" stage of register R via the gate $U_{10}$, to the bus bar I1, when counter Z is in position "0."

The ten AND-circuits $U_7$, each of which comprises two inputs, are individually connected to outputs of the counter Z and to individual leads extending from the final-address bus bar set EAS. If a coincidence is detected by one of the ten AND-circuits, then a signal for setting the counter to the idle position L is transmitted via the OR-circuit $O_1$. The same signal is also conveyed to other parts of the computing system via the line EU, i.e. for indicating that the transfer of a partial word is terminated, and that a new sequence of operations may be started.

Special characters contained within the information conveyed on lines I1 may be recognized by means of the circuit arrangement SZE. In this instance, it is assumed, for example, that the circuit arrangement is capable of recognizing two special signals *e* and *ef*. For that reason this circuit arrangement comprises two corresponding outputs which lead to two gating circuits $U_8$. To the other inputs of the gating circuits $U_8$ there are applied control signals $B_3$ and $B_4$ which determine whether one or more of the special signals or characters are to be effective. The two AND-circuits $U_8$ act via the OR-circuit $O_1$ to set the counter Z to the idle position L.

Via the information line I2 there is continuously applied, from an external source (not shown), an arbitrary search signal which is to be matched against a stream of characters appearing on lines I1. With the aid of the comparator $VGL_1$ it may thus be determined in the course of a search operation, if and at what phase of the information handling process relative to the register R, this search signal is to become effective. The position of the counter Z at the instant of matching, that is, the point in the character stream on I1 at which the signal matching the search signal is positioned, is taken off the counter Z and is fed under the control of the control signal $B_6$, via the gating circuits $U_9$ and the input bus bar BL, in dependence upon the control signal *p*1 or *pr* respectively, to one of the two single-character registers R1 or R*r* respectively. Thus R1 and R*r* may be set in accordance with information in the information signal stream from which partial words are to be extracted.

Details of the counter Z of FIGURE 2 are shown in FIGURE 6. In this particular illustration there is shown a ring counter in which, at any time, one and only one position is marked. The mode of operation of the electronic locking arrangement which is necessary to this end, will be explained in detail with reference to an example shown in connection with FIGURE 7. In response to forward and backward control signals VW and RW the counter is adapted to count either in the forward or in the backward direction. Moreover, in response to a signal on the leads $E_0$, $E_1$, . . . , the counter is adapted to jump from any random position to another random position corresponding to the external signal. In addition to the positions from 0 to 9 (FIGURE 2), there is provided an idle position L which is actually of the same or equal status. FIGURE 6 only shows three of the actually existing eleven flip-flop stages. $E_0$ to $E_2$ signify three of the eleven external inputs of the counter; $A_0$ to $A_2$ signify three of the ten active outputs. Each flip-flop stage is provided at its input with an OR-circuit, e.g. $O_5$ to $O_7$, to each of which there are applied the signals from a group of three AND-circuits—e.g. $U_{18}$ to $U_{20}$, $U_{21}$ to $U_{23}$, $U_{24}$ to $U_{26}$. To one of the inputs of each OR-circuit $O_5$, $O_6$, $O_7$ there are respectively applied the output signals from AND-circuits $U_{19}$, $U_{22}$ and $U_{25}$, one input of each of which is respectively connected to the output of the preceding flip-flop stage, and the other inputs of which are connected in common to the clockpulse line $t_1$. A second group of inputs to the OR-circuits extends from the AND-circuits $U_{18}$, $U_{21}$, $U_{24}$, one input of which is coupled to the output of the following flip-flop stage, and the other inputs of which are coupled in common to the clock-pulse line $t_2$. The third group of inputs to the OR-circuits $O_5$, $O_6$ and $O_7$ extends from the AND-circuits $U_{20}$, $U_{23}$ and $U_{26}$, one input of each of the latter being directly connected to the input leads $E_0$, $E_1$ and $E_2$, and the other inputs thereof being connected in common to a clockpulse lead $t_3$.

The three clockpulse leads $t_1$, $t_2$ and $t_3$ extend from the outputs of respective AND-circuits $U_{15}$, $U_{16}$ and $U_{17}$. The AND-circuit $U_{15}$ becomes effective when, besides the clockpulses $t$, there are applied the control signals $E_{in}$ ("Counter on") and VW ("Count Forward"). Similarly, the AND-circuit $U_{16}$ becomes effective if, besides the clockpulses $t$, there are applied the control signals $E_{in}$ ("Counter on"), and RW ("Count Backward"). Both the AND-circuits $U_{15}$ and $U_{16}$ are further controlled by signal $\overline{FR}$ derived by inverting the output FR of OR-circuit $O_8$, in order to block these two AND-circuits when the AND-circuit $U_{17}$ becomes effective. The input signals $E_0$ to $E_9$ are applied to the inputs of OR-circuit $O_8$, and are thus effective in combination to produce the signal FR for controlling AND-circuit $U_{17}$. Besides the clockpulse $t$, the control signals $E_{in}$ ("Counter on") are applied to the remaining input of the AND-circuit $U_{17}$. AND-circuit $U_{17}$ thus controls the external setting of the counter. The output signals of the counter may be taken off at the terminals indicated by the references $A_0$, $A_1$, $A_2$. . . .

The mode of operation of the counter is a simple one. In response to control signals $E_{in}$, and "Forward (VW)" or "Backward (RW)," the counter will start to count forward or backward beginning with the next clockpulse $t$, from the particular position in which it is then positioned, and this continues as long as the control signals are applied. Each clockpulse advances the counter by one position. If a "1-out-of-10" signal is applied to one of the ten inputs $E_0$ to $E_9$, by the signal $B_1$ or $B_2$ (FIGURE 2) for one clockpulse period, then the counter will be externally set to the corresponding position in response to the next clockpulse $t$.

The described counter is thus designed for a versatile use. The circuit arrangement is laid out in such a way that the counter may be used as a simple type of forward counter, as a simple type of backward counter, as a simple ring counter, and as a counter capable of being set externally. By providing any suitable type of translator between the outputs and the inputs, the counter may be adapted to perform skips or jumps. For example if, by such translator, the output $A_0$ is connected to the input $E_2$, then the counter, as soon as it reaches the position $A_0$, will jump to the position $A_2$.

The counter which has been described with reference to FIGURE 6, is intended to assume one position at a time. In order that this occurs reliably, there is used the circuit arrangement according to FIGURE 7. In this drawing two flip-flop stages $FF_0$ and $FF_1$ of the counter Z are shown in still greater detail, the stage $FF_0$ being shown in full detail along with the input circuits coupled thereto. The three diodes D coupled to the base electrode B of the transistor $T_1$ constitute the OR-circuit $O_5$ shown in FIGURE 6. Accordingly, the three resistor-capacitor networks correspond to the AND-circuits $U_{18}$, $U_{19}$ and $U_{20}$. The capacitor-type of AND-circuit which is, e.g., composed of the capacitor $C_{19}$ and of the resistor $R_{19}$, acts in such a way that an output signal will be transmitted through the diode if the capacitive input is switched on (positive) at the same time-position at which the ohmic input is switched off (positive). The basic mode of operation of each flip-flop circuit is well-known in the art.

The flip-flop stages $FF_0$, $FF_1$, . . . have one common emitter resistance $R_G$ with respect to the eleven transistors $T_2$, $T_4$, . . . This resistor $R_G$ is so dimensioned that a voltage of 0 volt will be applied to the bar S if one of these eleven transistors is unblocked (or rendered conductive). Upon stepping-on from one flip-flop stage to the next, two right-hand transistors will be unblocked simultaneously. The voltage at the bus bar S will thus become negative. On account of this, however, actually both of the flip-flops will tend to re-set to the OFF position (left-hand transistor conductive). That particular flip-flop, however, which has received the signal at the base of its left-hand transistor, will thus tend to remain set in the ON position after this process. Via the base resistors, the capacitors act as intermediate storage devices. On account of this measure there will result, on one hand, the advantage that always one and only one flip-flop can be set at a time. Moreover, there is required no additional control process for effecting erase or resetting of the preceding flip-flop.

The mode of operation of the partial-word addressing will now be described with reference to FIGURE 2. Various modes of operation are possible. The first mode of operation will be referred to as the normal partial-word addressing mode, or normal mode. As has already been mentioned hereinbefore, the addressing process may be effected from the left to the right, as well as from the right to the left. The normal mode of operation is the same in both cases. The process extends in several successive steps. At first, in two successive steps, the partial word initial address and the partial word final address are transferred into the single-character storages Rl and R*r*. If the partial-word processing is supposed to be effected from the left to the right, then the contents of the single-character storage Rl are applied to the counter Z via CW and $U_3$, as the partial-word initial address. Thereupon the counter Z is advanced in the forward sense, in a step-by-step manner, by the clockpulses $t$ and the control signals "VW" and "On" ($E_{in}$), i.e., until the output of comparator $U_7$ causes the counter to jump to the idle position L. When the counter jumps to position L, the control signal $E_{in}$ is turned off, via the signal on EU and means not shown, and it remains off until the beginning of the next cycle of system operations. Together with the individual steps of the counter, and in response to a writing-(S) or reading-(L*e*) control instruction, the information is either read into or out of the selected stages of register R.

The arrangement of FIGURE 2 may also be used for the purpose of comparing two partial words which may be stored in different storage units—e.g., the register R and another unit (not shown) coupled to bus lines $I_2$. In this mode of operation, termed the comparison mode, the contents of the two registers are compared via the bus bars I1 and I2, and the comparator $VGL_2$. The problem of having to compare two partial words may arise, for example, in cases where two account numbers are to be compared with one another. The account numbers may be positioned, e.g., at different points within words having fixed word lengths. It is assumed that the account number is positioned in the register R at stages 3 to 7, and in the not shown unit at character positions 4 to 8. The comparison is now carried out starting with the partial word initial addresses, hence in this particular case with 3 and 4. If a non-conformity between the two information items is already detected at the first character position of the partial word, or at a later character position, then an output signal is transmitted by the comparator $VGL_2$, indicating that the two information items are not identical. Via the gate $U_{27}$, enabled by control signal $B_5$ during the comparison phase, this output signal is applied to the OR-circuit $0_1$ which thereby causes the counter Z to jump to the idle position L, thus interrupting the process of comparison. At the same time a signal is transmitted on the line EÜ, indicating completion of the comparison process.

In the fields of data or information processing it is customary to transmit information in blocks between different storage units, or between a storage unit and an arithmetic unit. The inventive type of circuit arrangement may also be advantageously applied to this case. In FIGURES 3 and 4 there are schematically shown two examples relating to this mode of operation, termed the block transmission mode. According to FIGURE 3, each multi-word block $K_1$, consists of five-character word groups, and an end-of-block character signal *e*. In the lower part of FIGURE 3 there is shown the storage format of block $K_1$ including the end-of-block character *e*. This block is now supposed to be transferred to an operational storage device A which is shown symbolically by a vertical stroke. The operational storage device is composed of a plurality of word cells of fixed length, and the block $K_1$ is to be distributed therein as shown (i.e. between positions 4 and 9 in each word cell). When transferring the block $K_1$ into the operational storage A, first of all the first word cell of K is fed into stages 4 to 9 of the register R in normal mode fashion (see FIGURE 2). In the course of the next step, if other information is to be combined with the $K_1$ word, such information will be entered into the register R by suitable manipulation of counter Z. On account of this, and in the register R, there is stored on one hand the $K_1$, information word at the selected positions, and the other information at positions provided therefor. At the end of the whole process, the entire contents of the register R are transferred into the operational storage A. This process is performed analogously for each word or each word cell respectively. If, at the end of the block transmission, the last word is stored in the register R, then the end-of-block character *e* will appear at a predetermined phase of the transfer cycle. This end-of-block character is thus contained in the information appearing on the bus bar I1. With the aid of control signal $B_3$ and the special signal- or character-recognition circuit SZE, there is effected the recognition of the end-of-block character *e*, which is taken off the output of the circuit arrangement SZE, and is used, via the OR-circuit $O_1$, to effect the disconnection, or the jumping to the idle position L of the counter Z. This terminates the transmission of the block. Thus, the information contained in block $K_1$ is now contained in the operational storage at the assigned word positions, in this case at positions 4 to 9, in the individual word cells. Whenever the information is supposed to be read out of the operational storage device, the reverse process may be performed correspondingly.

The circuit arrangement SZE for recognizing the special signals (characters), is not only capable of recognizing the end-of-block characters *e*, but also the end-of-word characters *ef*. To this end of the circuit arrangement SZE is provided with a second output *ef*. This end-of-word character *ef* is used in the transmission of information organized as in FIGURE 4. The end-of-word character is made effective during the transmission of words having variable word lengths which may exceed the fixed length of register R. The process of storing the block $K_2$ (FIGURE 4) is performed in a similar way as that of storing the block $K_1$, which has been described hereinbefore with reference to FIGURE 3. The storing or readin may be effected between any arbitrary initial and final address, for example, between $1=0$ and $r=9$. In FIGURE 4 it is assumed that the word length is greater than the normal fixed word length. This, however, is not mandatory; in fact, it is also possible for the variable word length to be smaller than the fixed word length. In any case the storing or readin is started at the initial address of the word, and is interrupted upon reaching the end-of-word character *ef* during addressing of the corresponding fixed word position. The end-of-block character *e* acts in the same way as described hereinbefore in connection with FIGURE 3.

With reference to FIGURES 2 and 5 there is described a search mode of operation in the course of which there is supposed to be determined the partial-word address of a particular character previously stored in the register R.

This character, for which the search is being carried out, is applied from an external source (not shown), via the information line I2, to the comparator $VGL_1$. It may be searched for by starting forward from counter position 0, or backward from position 9 by suitable choice of control signals. In the first-mentioned case there is searched for the left-hand address, and in the second case there is searched for the right-hand address. By the comparator $VGL_1$, the reference character signals, on the information lines I2, are continuously compared with the respective character signals on the bus bar I1. In the event of an agreement, the counter Z is switched to the idle position L, thus terminating the search process; prior thereto, however, the last state of the counter Z is stored as a 5-digit code combination in the storage R1 or R*r* respectively, i.e via the converter GWZ and AND-circuits $U_9$, and $U_1$ or $U_2$, respectively.

In the course of performing the partial-word addressing according to FIGURE 2, the word with the fixed word length must always first be brought from the main storage into the register R, and restored in the main storage subsequently to the processing. The entire arrangement, however, may also be modified in such a way that the processing of the word cells is effected in the main storage itself.

For the sake of simplicity, and since the design thereof is well known to those skilled in the data handling arts, particulars of the construction of most of the blocks in FIGURE 2 have not been fully described above. These include the signal form converters CW and CWZ, the comparators, $VGL_1$ and $VGL_2$, the special signal recognition circuit SZE, and the various sets of AND-circuits $U_1$ to $U_{11}$. In this respect it is noted that the design of many-to-one and one-to-many conversion circuits, similar in type to CW and CWZ, is fully treated in "The Design of Switching Circuits," W. Keister, A. E. Ritchie, and S. H. Washburn, pp. 292 to 302. It is further noted that the design of special character recognition circuits and AND-circuits is considered fundamental in the data transmission arts.

While we have described above the principles of our invention in connection with specific apparatus, it is to be clearly understood that this description is made only by way of example and not as a limitation on the scope of our invention as set forth in the objects thereof and in the accompanying claims.

What we claim is:

1. A circuit arrangement for processing variable length data word items in a data processing system organized for processing word signal groups of fixed length, comprising:

means for signalling the beginning and end positions of a data word item with reference to a full complement of positions within a word of predetermined fixed length;

a register having the capacity to store a word having said predetermined fixed length;

a set of data signal conveying bus lines;

means coupled to said position signalling means for effecting a sequential transfer of data signals between successive stages of said register and said set of bus lines commencing at an initial position in said register corresponding to said beginning position signal and proceeding thru a terminal position in said register corresponding to said end position signal, and including a ring counter having an idle position L and a plurality of active positions corresponding to the said full complement of positions in a word of said predetermined fixed length;

means effective at the beginning of a cycle of operation of said transfer effecting means for setting said ring counter to an initial active position corresponding to said beginning position signalled by said signalling means;

means thereafter effective to advance the state of said counter through a predetermined sequence of said active positions including a position corresponding to the said terminal position;

means conditioned by said operation terminating means for setting said counter to the said idle position;

means coupled to said counter, said bus lines and said register for effecting transfer of data signals between said bus lines and said register in correspondence with the active positions of said counter;

said counter including a plurality of flip flops, a transistor of each being connected to a common emitter resistance; and means rendered effective upon completion of the transfer of data relative to said terminal position of said register for terminating the operation of said transfer effecting means and for transmitting a signal indicative of such termination of the associated transfer operation.

2. A circuit arrangement for processing variable length data word items in a data processing system organized for processing word signal groups of fixed length, comprising:

means for signalling the beginning and end positions of a data word item with reference to a full complement of positions within a word of predetermined fixed length;

a register having the capacity to store a word having said predetermined fixed length;

a set of data signal conveying bus lines;

means coupled to said position signalling means for effecting a sequential transfer of data signals between successive stages of said register and said set of bus lines commencing at an initial position in said register corresponding to said beginning position signal and proceeding thru a terminal position in said register corresponding to said end position signal, and including a ring counter having an idle position L and a plurality of active positions corresponding to the said full complement of positions in a word of said predetermined fixed length;

means effective at the beginning of a cycle of operation of said transfer effecting means for setting said ring counter to an initial active position corresponding to said beginning position signalled by said signalling means;

means including AND gates responsive to FORWARD and BACKWARD control signals thereafter effective to alter the state of the counter in a forward or backward sense with respect to said initial active position through a predetermined sequence of said active positions including a position corresponding to the said terminal position;

means conditioned by said operation terminating means for setting said counter to the said idle position;

means coupled to said counter, said bus lines and said register for effecting transfer of data signals between said bus lines and said register in correspondence with the active positions of said counter; and means rendered effective upon completion of the transfer of data relative to said terminal position of said register for terminating the operation of said transfer effecting means and for transmitting a signal indicative of such termination of the associated transfer operation.

3. A circuit arrangement for processing variable length data word items in a data processing system organized for processing word signal groups of fixed length, comprising:

means for signalling the beginning and end positions of a data word item with reference to a full complement of positions within a word of predetermined fixed length;

a register having the capacity to store a word having said predetermined fixed length;

a set of data signal conveying bus lines;

means coupled to said position signalling means for effecting a sequential transfer of data signals between stages of said register and said set of bus lines commencing at an initial position in said register corresponding to said beginning position signal and proceeding thru a terminal position in said register corresponding to said end position signal;

means rendered effective upon completion of the transfer of data relative to said terminal position of said register for terminating the operation of said transfer effecting means and for transmitting a signal indicative of such termination of the associated transfer operation.

the said ring counter having an idle position L and a plurality of active positions corresponding to the said full complement of positions in a word of said predetermined fixed length;

means effective at the beginning of a cycle of operation of said transfer effecting means for setting said ring counter to an initial active position corresponding to said beginning position signalled by said signalling means;

means thereafter effective to advance the state of said counter through a predetermined sequence of said active positions including a position corresponding to the said terminal position;

means conditioned by said operation terminating means for setting said counter to the said idle position;

means coupled to said counter, said bus lines and said register for effecting transfer of data signals between said bus lines and said register in correspondence with the active positions of said counter; and means selectively operable in response to a special character signal in the data signals being handled on said bus lines to alternatively actuate said operation terminating means in correspondence with the appearance of said special signal on said bus lines.

4. A circuit arrangement for processing variable length data word items in a data processing system organized for processing word signal groups of fixed length, comprising:

means for signalling the beginning and end positions of a data word item with reference to a full complement of positions within a word of predetermined fixed length;

a register having the capacity to store a word having said predetermined fixed length;

a set of data signal conveying bus lines;

means coupled to said position signalling means for effecting a sequential transfer of data signals between successive stages of said register and said set of bus lines commencing at an initial position in said register corresponding to said beginning position signal and proceeding thru a terminal position in said register corresponding to said end position signal;

means rendered effective upon completion of the transfer of data relative to said terminal position of said register for terminating the operation of said transfer effecting means and for transmitting a signal indicative of such termination of the associated transfer operation;

the said ring counter having an idle position L and a plurality of active positions corresponding to the said full complement of positions in a word of said predetermined fixed length;

means effective at the beginning of a cycle of operation of said transfer effecting means for setting said ring counter to an initial active position corresponding to said beginning position signalled by said signalling means;

means thereafter effective to advance the state of said counter through a predetermined sequence of said active positions including a position corresponding to the said terminal position;

means conditioned by said operation terminating means for setting said counter to the said idle position;

means coupled to said counter, said bus lines and said register for effecting transfer of data signals between said bus lines and said register in correspondence with the active positions of said counter;

means for conveying a special search character signal;

comparator means selectively responsive to a matching of signals conveyed by last-mentioned means and said bus lines to alternatively actuate said operation terminating means to set said counter to said idle position; and means responsive to the output of said comparator means for conditioning said beginning and end position signalling means in accordance with the last active position of said counter preceding the said setting thereof to said idle position.

References Cited by the Examiner

UNITED STATES PATENTS 2,969,913 1/1961 Cherin et al. ------- 340—172.5

ROBERT C. BAILEY, *Primary Examiner.*

G. D. SHAW, *Assistant Examiner.*